(12) United States Patent
Hoobyar et al.

(10) Patent No.: US 7,192,003 B2
(45) Date of Patent: Mar. 20, 2007

(54) ASEPTIC SAMPLING VALVE

(75) Inventors: Luther Thomas Hoobyar, Mountain View, CA (US); Walter L. Connolly, Moraga, CA (US); Loyd C. Sindel, Discovery Bay, CA (US)

(73) Assignee: Aseptic Controls Investment Co., San Francisco, CA (US)

( * ) Notice: Subject to any disclaimer, the term of this patent is extended or adjusted under 35 U.S.C. 154(b) by 27 days.

(21) Appl. No.: 10/947,396

(22) Filed: Sep. 21, 2004

(65) Prior Publication Data

US 2006/0060812 A1 Mar. 23, 2006

(51) Int. Cl.
*F16D 31/00* (2006.01)
(52) U.S. Cl. .................................... 251/63; 251/331
(58) Field of Classification Search ............ 251/144, 251/331, 335.2; 137/240, 241, 63
See application file for complete search history.

(56) References Cited

U.S. PATENT DOCUMENTS

| | | | |
|---|---|---|---|
| 2,865,394 A * | 12/1958 | Presley | 137/334 |
| 3,370,827 A * | 2/1968 | Stehlin | 251/14 |
| 4,423,641 A | 1/1984 | Ottung | |
| 4,822,570 A * | 4/1989 | Lerman et al. | 422/119 |
| 4,836,236 A * | 6/1989 | Ladisch | 137/241 |
| 5,095,765 A | 3/1992 | Filbey | |
| 5,152,500 A * | 10/1992 | Hoobyar et al. | 251/269 |
| 5,246,204 A | 9/1993 | Ottung | |
| 5,360,198 A | 11/1994 | Amorese et al. | |
| 6,133,022 A | 10/2000 | Newberg | |
| 6,491,283 B2 | 12/2002 | Newberg | |
| 6,601,823 B2 | 8/2003 | Newberg | |
| 6,648,006 B1 * | 11/2003 | Ostergaard | 137/241 |
| 2002/0185626 A1 * | 12/2002 | Newberg | 251/331 |
| 2004/0021121 A1 | 2/2004 | Newberg | |

* cited by examiner

*Primary Examiner*—Justine Yu
(74) *Attorney, Agent, or Firm*—Edward S. Wright

(57) ABSTRACT

Aseptic sampling valve having a valve body with a generally cylindrical side wall and a relatively thin, generally planar end wall, an inlet opening in the end wall, a valve seat surrounding the inlet opening, a port opening through the side wall and extending toward the inlet opening at an acute angle relative to the axis of the valve body, and a valve member movable axially within the valve body between open and closed positions relative to the valve seat for controlling communication between the inlet opening and the port.

18 Claims, 5 Drawing Sheets

# ASEPTIC SAMPLING VALVE

BACKGROUND OF THE INVENTION

1. Field of Invention

This invention pertains generally to aseptic valves and, more particularly, to a valve for obtaining samples of aseptic liquid from a mixing vessel or other sterile container.

2. Related Art

Aseptic valves used, for example, in the transfer of aseptic liquids from mixing vessels to sterile containers typically have bodies which are either welded or clamped to the walls of the vessels, with deformable diaphragms controlling communication between inlet openings which communicate with the vessels and ports in the side walls of the valve bodies. Such valves must be kept free of contaminants in order to prevent contamination of the liquids passing through them.

OBJECTS AND SUMMARY OF THE INVENTION

It is, in general, an object of the invention to provide a new and improved aseptic sampling valve.

Another object of the invention is to provide an aseptic sampling valve of the above character which overcomes the limitations and disadvantages of sampling valves heretofore provided.

These and other objects are achieved in accordance with the invention by providing an aseptic sampling valve having a valve body with a generally cylindrical side wall and a relatively thin, generally planar end wall, an inlet opening in, the end wall, a valve seat surrounding the inlet opening, a port opening through the side wall and extending toward the inlet opening at an acute angle relative to the axis of the valve body, and a valve member movable axially within the valve body between open and closed positions relative to the valve seat for controlling communication between the inlet opening and the port.

DETAILED DESCRIPTION

Figure 1:
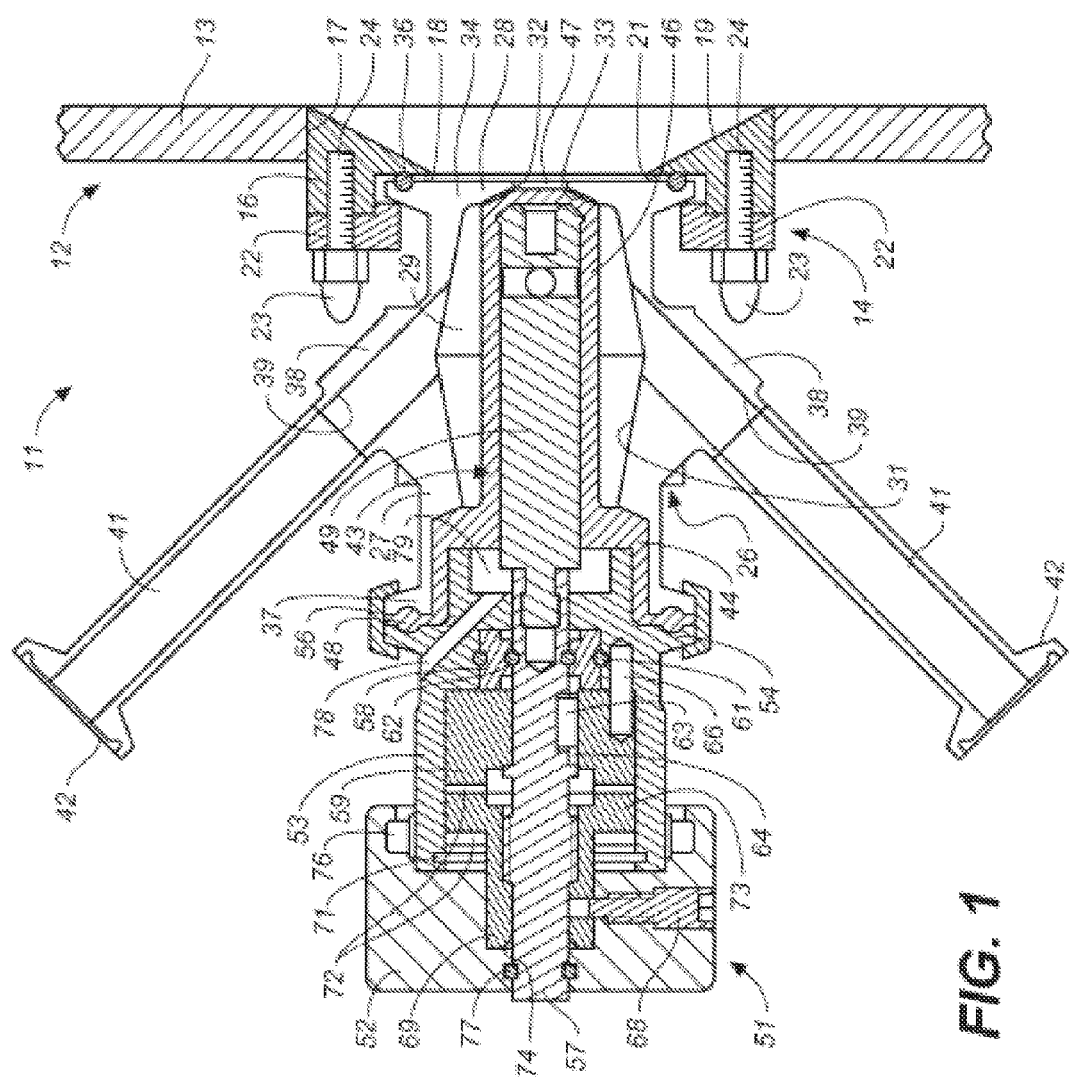
FIG. 1 is a vertical sectional view of one embodiment of an aseptic sampling valve incorporating the invention.

In FIG. 1, the sampling valve 11 is illustrated in connection with a mixing vessel 12 having an upstanding cylindrical side wall 13 which is typically fabricated of stainless steel and has a thickness on the order of ¼ to ½ inch. The valve is mounted on the side wall of the vessel by means of a conventional coupling device 14 which has a short cylindrical body 16 that is welded into a circular opening 17 in the side wall, with the inner end portion of the coupling body being ground flush with the inner surface of the side wall. The body has a central opening or bore 18, with an inlet cone 19 leading to that opening on the inner side of the body.

On the outer side of the coupling body, an annular seat 21 surrounds the opening for receiving a mounting flange on the coupled device, with a split ring 22 for clamping the flange to the seat. In the embodiment illustrated, the two segments of the split ring are secured to the body by nuts 23 on studs 24 which are threaded into the body. The coupling device is fabricated of a material such as stainless steel which can be thoroughly cleaned and sterilized.

The valve has a body 26 with a generally cylindrical side wall 27 and a relatively thin, generally planar end wall or back plate 28 at the inner or tank end of the body. These walls define a valve chamber 29 which is open toward the outer end of the valve body. In the embodiment illustrated, the inner surface 31 of the side wall has a double conical taper such that it and the valve chamber increase in diameter from the ends of the chamber toward the middle, and the wall surface has a V-shaped profile in the sectional view.

An inlet opening 32 is formed in the end wall of the valve body and surrounded by a conically tapered valve seat 33. A mounting flange 34 extends radially from the side wall at the inner end of the body and is clamped into the seat of coupling device 14, with a gasket 36 providing a seal between the two. The side wall extends beyond the chamber and has an annular flange 37 at its outer end.

Valve body 26 also has a pair of diametrically opposed external bosses 38 which project from side wall 27 and have ports 39 formed therein. The ports open through the side wall and communicate directly with valve chamber 29. The ports extend at an acute angle relative to the axis of the valve body and chamber, with the axes of the ports extending outwardly and away from the inner end of the body. In the embodiment illustrated, the ports extend at an angle of approximately 45° relative to the axis of the valve body and chamber, and open through the side wall toward the middle of the chamber where the diameter is the greatest.

Tubular fittings or pipes 41 extend coaxially from ports 39, with flanges 42 at their outer ends for connection to external devices (not shown) such as a steam source, a drain line, and collection bottles.

In the preferred embodiment, valve body 26 is fabricated as a unitary structure from stainless steel bar stock. It is turned on a lathe to form the portions with circular symmetry such as side wall 27, end wall 28, inlet opening 32 and flanges 34, 37, then machined to form bosses 38, and bored to form ports 39. Pipes 41 are welded to the bosses and ground internally to provide a smooth transition between the inner walls of the ports and the pipes.

A valve member 43 is mounted in chamber 29 for axial movement between open and closed positions relative to valve seat 33 to control communication between inlet opening 32 and ports 39. In the embodiment illustrated, the valve member is in the form of a deformable diaphragm 44 fabricated of an elastic material such as silicone rubber with a cylindrical side wall 46 and an end wall 47 which is contoured to match valve seat 33. The side wall increases in diameter toward the outer end of the valve body and terminates in an annular flange 48 which mates with flange 37 on the body.

A rigid valve stem or insert 49 extends coaxially within diaphragm 44. The diameter of the insert is slightly less than the inner diameter of side wall 46 so that the insert prevents the side wall from collapsing while permitting it to shorten as the valve member moves from the closed position with end wall 47 in sealing engagement with valve seat 33 to an open position in which end wall 47 is spaced away from the valve seat.

An actuator 51 is mounted on the outer end of valve body 26 for moving the valve member between its open and closed positions. In the embodiment of FIG. 1, the actuator is manually operated and includes an operating knob 52 which is rotatively mounted on a cylindrical member or sleeve 53. Toward its inner end, the sleeve has a mounting flange 54 which is secured to the mounting flange 37 on the valve body by a ring clamp 56, with diaphragm flange 48 providing a fluid-tight seal and axial alignment between the two mounting flanges.

The actuator has an axially extending shaft 57 which is threadedly connected to the outer end of valve insert 49 and supported for axial movement within sleeve 53 by a pair of bushings 58, 59. Bushing 58 is positioned toward the inner end of the actuator and has O-rings 61, 62 which engage the inner wall of the sleeve and the outer surface of the shaft to prevent liquid from leaking into the actuator from the valve body. Rotation of the shaft is prevented by a key 63 which extends from the shaft and is slidably received in an axially extending keyway or slot 64 in bushing 59. That bushing is secured to sleeve 53 by an axially extending pin 66 which prevents it from rotating within the sleeve.

Operating knob 52 is secured by a set screw 68 to a nut 69 which is threadedly engaged with shaft 57. The nut is rotatively mounted within sleeve 53 and retained in the sleeve by a snap ring 71, with thrust washers 72 between an enlarged hub or flange 73 on the nut, the outer face of bushing 59, and the snap ring. The outer end portion of the shaft extends through an opening 74 in the knob to indicate the position of the valve, and a wiper ring 76 and an O-ring 77 carried by the knob engage the sleeve and the shaft and provide a mild resistance to rotation of the knob.

A passageway 78 for detecting leakage through the diaphragm extends through the inner end portion of actuator sleeve 53. This passageway communicates with a cavity 79 at the outer end of valve chamber 29, and in the event of a rupture or other leakage of the diaphragm, the liquid will leak into this cavity and drip out of the passageway where it is readily seen.

Operation and use of the sampling valve is as follows. The valve is mounted on the side wall of the mixing vessel, with the axis of the valve extending in a horizontal direction and ports 39 positioned on the upper and lower sides of the valve. The valve is closed by rotating knob 52 in a clockwise direction to move shaft 57 in an inward direction and thereby extend the cylindrical side wall 46 of the diaphragm and press the end wall 47 into sealing engagement with valve seat 33. When that is done, the end wall deforms to fill inlet opening 32 and presents a substantially smooth surface on the side of back plate 28 facing the tank. The valve is opened by rotating knob 52 in a counter-clockwise direction to withdraw the valve member from the seat.

To clean the valve, a steam line (not shown) is connected to the pipe 41 on the upper side of the valve body, and a drain line is connected to the lower pipe. Because of the angle at which the pipes are inclined, the steam flowing through the upper pipe is directed directly toward the valve opening and impinges upon the valve member and the back plate at an oblique angle, producing a turbulence which is very effective in cleaning those critical parts of the valve. Condensate and contaminants dislodged by the steam flow down the sloping bottom wall of the chamber and out through the lower port and the line connected to the lower pipe.

In a typical operating sequence, the valve is closed and flushed with steam, following which the valve is opened to fill a container connected to the pipe on the lower side of the valve with product from the tank. The valve is then closed, and the container is removed. The valve is then flushed again with steam, and the next container is filled.

Figure 2:
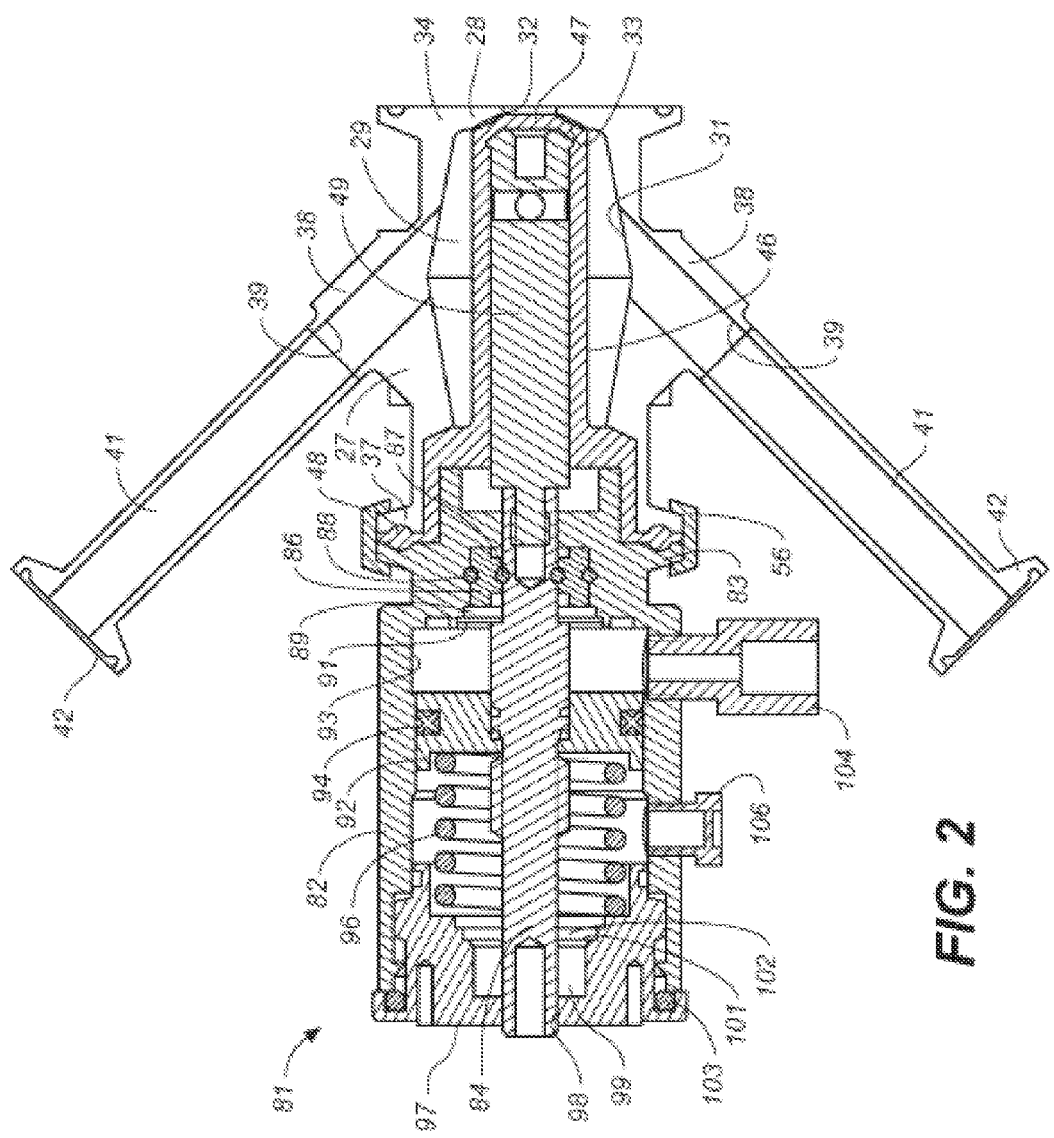
FIG. 2 is a vertical sectional view of another embodiment of an aseptic sampling valve incorporating the invention.

The embodiment of FIG. 2 is generally similar to the embodiment of FIG. 1, except it has a pneumatically operated actuator 81 rather than a manual one, and like reference numerals designate corresponding elements in the two embodiments.

Actuator 81 has a generally cylindrical housing 82 with a mounting flange 83 toward the inner end of the housing which is secured to the mounting flange 37 at the outer end of the valve body. An axially extending shaft 84 is threadedly connected to valve insert 49. The inner end portion of the shaft is supported by a guide bushing 86, with O-rings 87, 88 providing seals with the shaft and the inner wall of the sleeve to prevent liquid from leaking into the actuator from the valve body. The bushing is retained in the housing by a washer 89 and a snap ring 91.

A piston 92 is affixed to the shaft and slidably mounted in a bore 93 within the housing, with a quad ring 94 providing a seal between the piston and the wall of the bore. The valve member is urged toward valve seat 33 by a spring 96 which is constrained between the outer face of the piston and a plug 97 in the outer end of the housing. The outer end portion of the shaft extends through an opening 98 in the end wall of the plug and is supported by a guide bushing 99 in the plug. The guide bushing is retained in the plug by a washer 101 and a snap ring 102, and an O-ring 103 provides a seal between the plug and the housing as well as preventing leakage along the shaft.

An air inlet fitting 104 communicates with the bore on the back side of the piston, and a breather fitting 106 communicates with the bore on the front, or spring, side.

Operation and use of the embodiment of FIG. 2 is similar to that described above, except for the operation of the actuator. With the pneumatic actuator, the valve member is urged toward its closed position by spring 96 and is moved toward the open position by the application of pressurized air to the bore 93 on the back side of piston 92 via inlet fitting 104.

Figure 3:
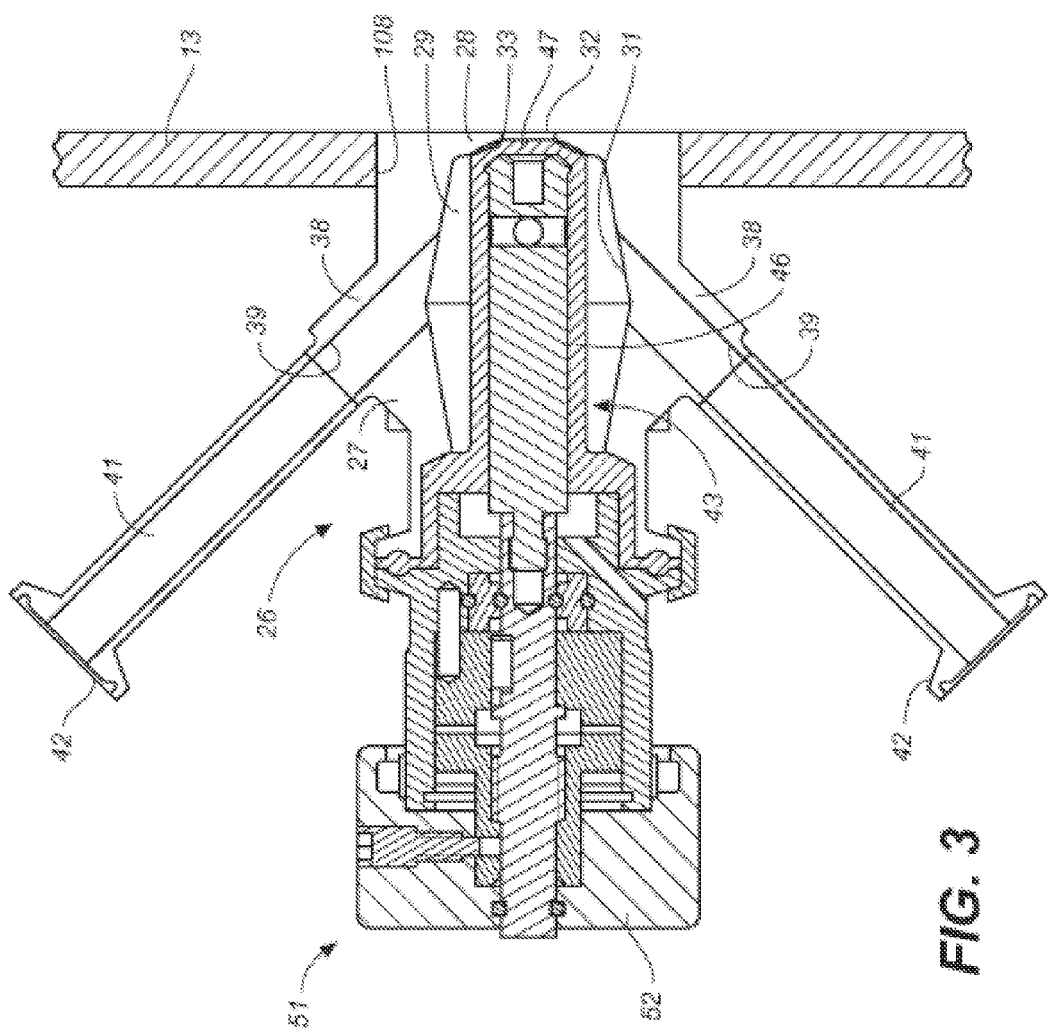
FIG. 3 is a view similar to FIG. 1 of another embodiment of an aseptic sampling valve incorporating the invention.
Figure 4:
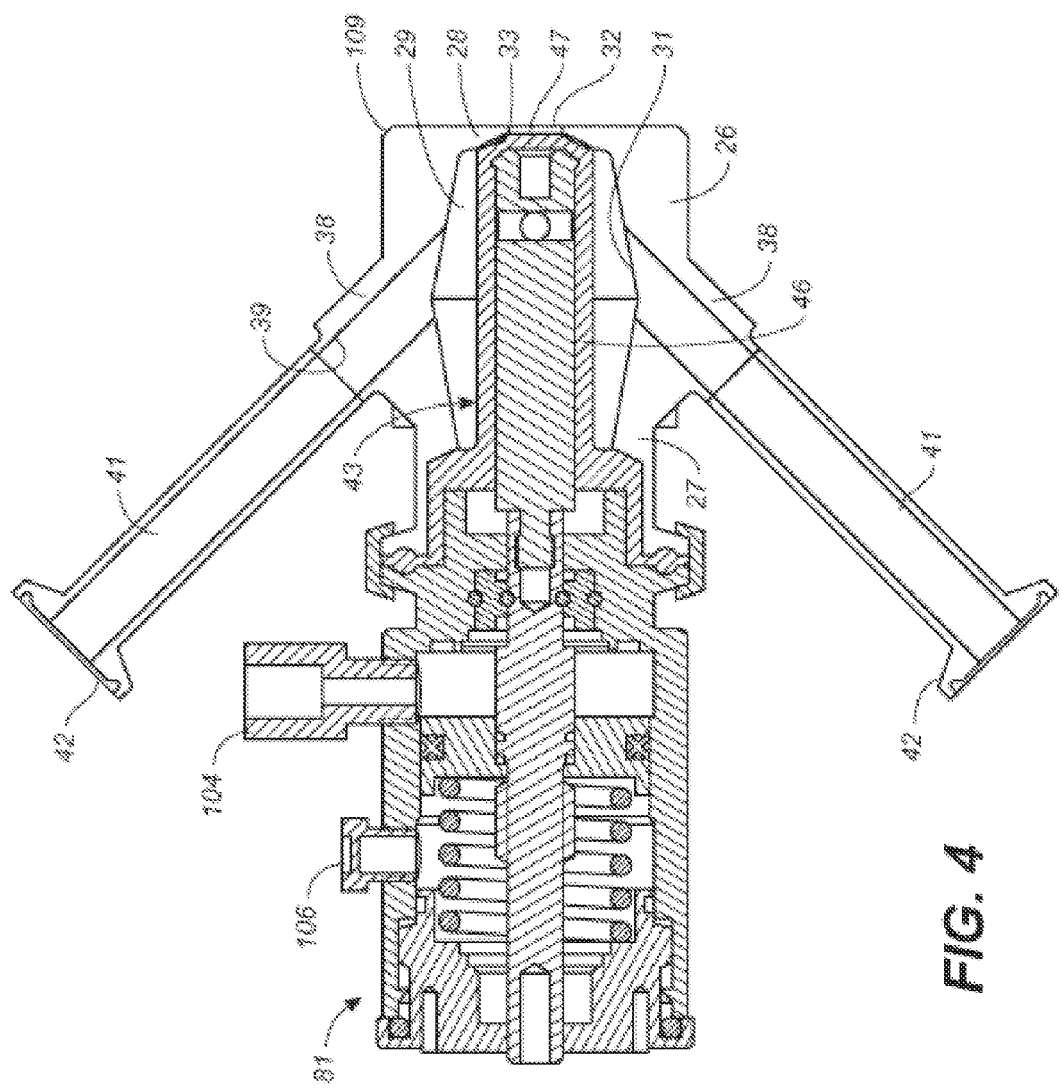
FIG. 4 is a vertical sectional view of another embodiment of an aseptic sampling valve incorporating the invention.

The embodiments shown in FIGS. 3 and 4 are similar to the embodiments of FIGS. 1 and 2, except for the manner in which the valves are attached to the mixing vessel, and like reference numerals once again designate corresponding elements in the different embodiments.

In the embodiments of FIGS. 3 and 4, the valve body 27 has no mounting flange, but instead is welded directly to the side wall 13 of the tank. The inner end portion of the valve body extends into a circular opening 108 in the side wall, and the outer face of back plate 28 is ground to match the curvature of the inner wall of the tank. These embodiments have the added advantage that there is no inlet cone as there is with the coupling device, and the steam or other liquid used for cleaning the tank will flow directly across the exposed face of the valve, rather than skipping over it as it might do with the inlet cone.

The inclination of the pipes 41 away from the tank wall also facilitates the welding of the valve body to the wall of the tank. With conventional valves having fittings close to the wall, it is very difficult for the welder to form a good bead in the portion of the weld near the fittings. With the fittings extending away from the wall, however, that is no longer a problem because the welder has substantially more room to work between the fittings and the wall.

If desired, the inner face of the valve body can be formed with a chamfered or beveled edge 109, as shown in FIG. 4, to improve the penetration of the weld on the inner side of the tank wall.

Figure 5:
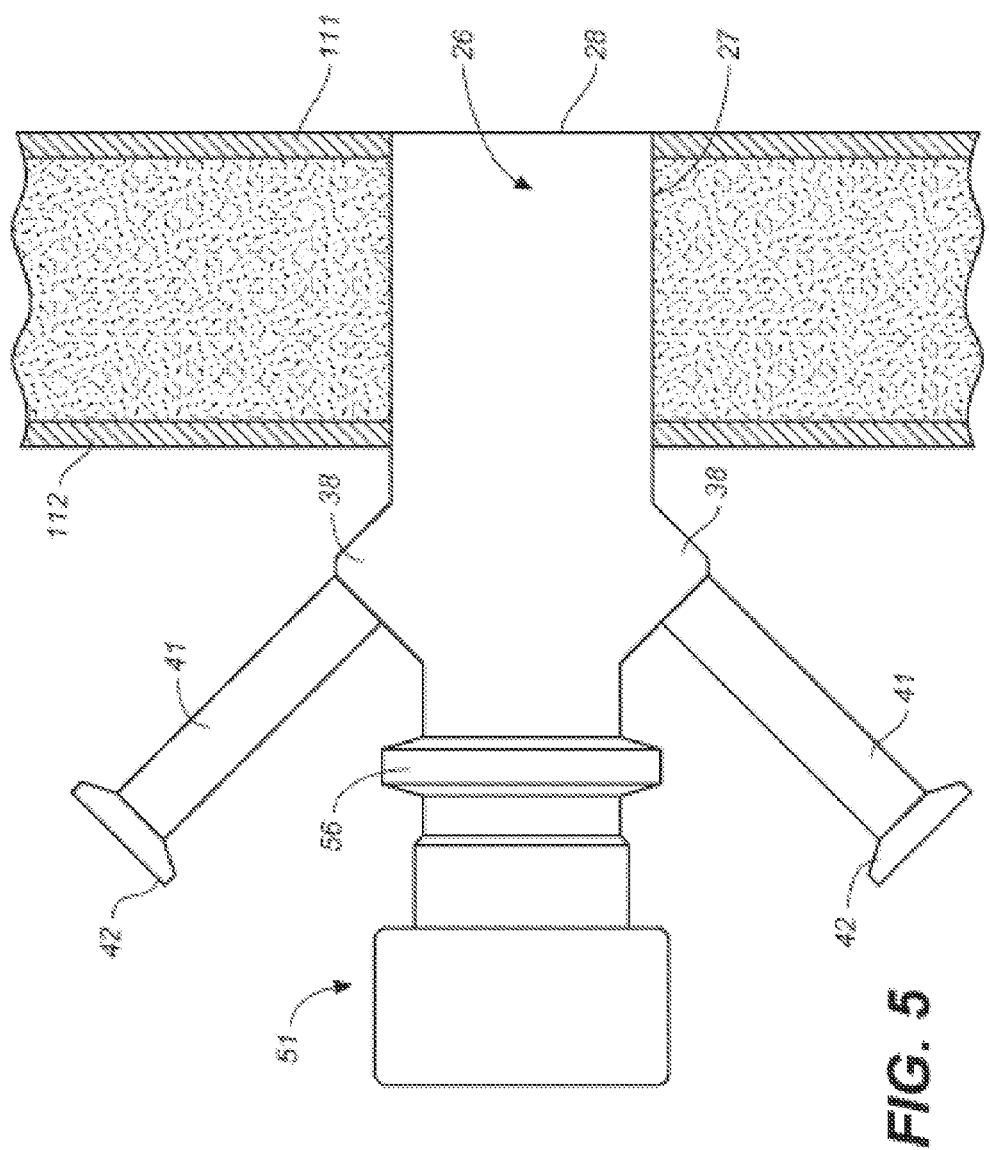
FIG. 5 is a vertical sectional view of another embodiment of an aseptic sampling valve incorporating the invention.

The embodiment of FIG. 5 is particularly suitable for use with double walled, insulated tanks, and it is shown in connection with a tank having an inner wall 111 and an outer wall 112. This embodiment is similar to the embodiment of FIG. 3, and like reference numerals designate corresponding elements in the two embodiments.

In the embodiment of FIG. 5, the side wall 27 of valve body 26 is elongated or extended to accommodate the additional wall thickness of the tank, and port bosses 38 are located outside the outer wall of the tank. Because of the inclination of the ports and the direction in which the steam is introduced, the steam will still reach the back plate and the inlet opening to provide good cleaning of the back plate and the valve member even though the ports are now located a substantial distance away from the back plate. That would not be possible with ports which extend at right angles from the valve body.

It is apparent from the foregoing that a new and improved aseptic sampling valve has been provided. While only certain presently preferred embodiments have been described in detail, as will be apparent to those familiar with the art, certain changes and modifications can be made without departing from the scope of the invention as defined by the following claims.

The invention claimed is:

1. An aseptic sampling valve, comprising: a valve body having a horizontally extending axis, an end wall at one end of the valve body, a chamber within the valve body which is disposed symmetrically about the axis and increases in diameter from the end wall toward the center of the body, an inlet opening in the end wall, a valve seat surrounding the inlet opening, a pair of ports opening into the chamber on upper and lower sides of the valve body where the diameter of the chamber is the greatest and extending away from the chamber at acute angles relative to the axis of the valve body, and a valve member disposed coaxially within the chamber for axial movement between open and closed positions relative to the valve seat for controlling communication between the inlet opening and the ports.

2. The sampling valve of claim 1 wherein each of the ports extends at an angle on the order of 45° relative to the axis of the valve body.

3. The sampling valve of claim 1 including a pipe extending coaxially from each of the ports.

4. The sampling valve of claim 1 wherein the valve body is adapted to be welded into an opening in the side wall of a generally cylindrical vessel, with the axis of the valve body extending in a generally horizontal direction.

5. The sampling valve of claim 1 including a radially extending mounting flange at the end of the valve body adjacent to the end wall.

6. The sampling valve of claim 1 including a manually operable actuator for moving the valve member between the open and closed positions.

7. The sampling valve of claim 1 including a pneumatic actuator for moving the valve member between the open and closed positions.

8. The sampling valve of claim 1 wherein the valve member comprises a diaphragm having a generally cylindrical side well which extends and contracts axially as the valve member is moved between the closed and open positions.

9. The sampling valve of claim 1 wherein the valve body is mounted to the side wall of a generally cylindrical vessel.

10. The sampling valve of claim 1 wherein the chamber has a conically tapered side wall.

11. An aseptic sampling valve, comprising: a valve body having a central axis, an end wall at one end of the body, an inlet opening in the end wall, a valve seat surrounding the inlet opening, a chamber within the body having a side wall with two oppositely inclined conically tapered sections which increase in diameter toward the center of the chamber, a pair of ports opening into the chamber on opposite sides of the body where the diameter of the chamber is the greatest and extending away from the body at acute angles relative to the axis of the body, and a valve member disposed coaxially within the chamber for movement between open and closed positions relative to the valve seat for controlling communication between the inlet opening and the ports.

12. The sampling valve of claim 11 wherein the ports extend at angles on the order of 45° relative to the axis of the valve body.

13. The sampling valve of claim 11 including a pipe extending coaxially from each of the ports.

14. The sampling valve of claim 11 wherein the valve body is adapted to be welded into a opening in the sidewall of a generally cylindrical vessel, with the axis of the valve body extending in a generally horizontal direction.

15. The sampling valve of claim 11 the valve body includes a radially extending mounting flange adjacent to the end wall.

16. The sampling valve of claim 11 including a manually operable actuator for moving the valve member between the open and closed positions.

17. The sampling valve of claim 11 including a pneumatic actuator for moving the valve member between the open and closed positions.

18. The sampling valve of claim 11 wherein the valve member comprises a diaphragm having a generally cylindrical side wall which extends and contracts axially as the valve member is moved between the closed and open positions.

* * * * *